April 10, 1945.  O. T. FRANCIS  2,373,113
APPARATUS FOR THE DETECTION OR SEPARATION OF A PLURALITY OF GASES
Filed Feb. 13, 1937
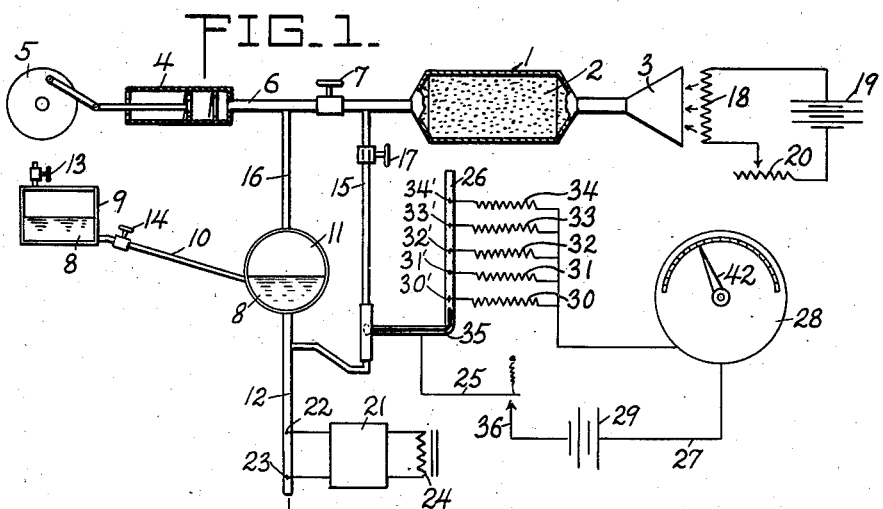
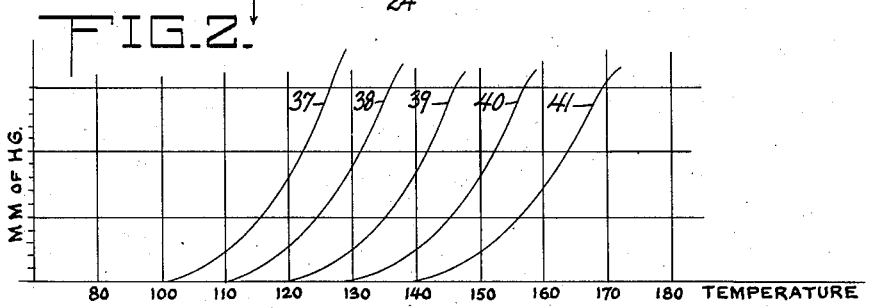
INVENTOR
OLIVER T. FRANCIS
BY
ATTORNEY Patented Apr. 10, 1945

2,373,113

UNITED STATES PATENT OFFICE 2,373,113

APPARATUS FOR THE DETECTION OR SEPARATION OF A PLURALITY OF GASES

Oliver T. Francis, United States Marine Corps

Application February 13, 1937, Serial No. 125,565

5 Claims. (Cl. 23—254)

(Granted under the act of March 3, 1883, as amended April 30, 1928; 370 O. G. 757)

My invention relates to an apparatus capable of selectively detecting or separating from each other a plurality of gases.

In application, Serial No. 125,564, filed February 13, 1937, I have described, among other things, an apparatus for selectively detecting the presence of a plurality of gases wherein the gases to be detected were fractionally separated after first condensing the same. thus rendering the operation of the apparatus specific to any one of a plurality of toxic and/or non-toxic gases. For condensing the gases the apparatus utilized refrigeration and consequently was unsuited for operation in the field. Furthermore, an exact quantitative separation of a mixture of gases cannot be achieved by fractionally separating the same at atmospheric pressure in the manner set forth in the aforesaid application, due to the fact that when the gases composing the mixture have slightly different boiling points the difference in vapor pressures of the gases at a given temperature is small. However, it is possible to separate a gas mixture quantitatively into its component parts and to completely isolate the constituents by the process which consists in the steps, firstly, of absorbing the gas mixture by a sufficiently large quantity of active charcoal or other suitable absorptive medium; and then removing the individual components by exhausting at a greatly diminished pressure, the temperature being chosen so that the more volatile component initially possesses a pressure sufficient for its complete removal from the absorbent whereas the less volatile components show no appreciable tension thereover. In devices operated in the field, however, it is not convenient to extract toxic and/or non-toxic gases at reduced pressures from 0.01 to 10 millimeters of mercury.

It is well known that many substances, of which activated charcoal is illustrative, will remove faint traces of certain toxic gases when air containing these gases is passed therethrough. Such gases when absorbed in charcoal, for example, below predetermined quantities develop substantially no vapor pressure over the charcoal until its temperature reaches a certain critical value. Furthermore, the amount of gas which the aforementioned substances can absorb before developing an appreciable vapor pressure thereover depends upon the nature of the gas. The maximum amount of chlorine, for example, capable of being absorbed by one cubic centimeter of charcoal is about 0.06 gram which would be approximately 19 cubic centimeters of pure chlorine at 760 millimeters of mercury. The maximum quantity of toxic or non-toxic gas which a substance can absorb under predetermined conditions without developing any vapor pressure over the absorbent is referred to as the saturation quantity in the specification hereinafter and in the claims.

In carrying out my invention, I make use of the principles set forth in the preceding paragraph in that I absorb at ambient, atmospheric temperature and pressure in charcoal or any other suitable absorbent the toxic and/or non-toxic gases which are to be separated or whose presence it is desired to detect, the said gases being absorbed therein in quantities which are not in excess of the saturation quantities of the respective gases; and then progressively heat the absorbent to cause the successive and fractional removal therefrom of the absorbed gases in the order of their respective temperatures at which the gases develop sufficient vapor pressure to preclude their retention by the absorbent. One method which I employ for progressively heating the absorbent consists in passing a relatively small quantity of air or other suitable fluid medium through the absorbent and progressively regulating the temperature of the said fluid medium for the optimum and successive removal of the absorbed gases.

With the foregoing preliminary discussion in view, it is among the several objects of my invention to provide an apparatus for selectively detecting the presence of a plurality of gases or any one of a plurality of gases at ambient, atmospheric temperature and pressure wherein the component parts of the apparatus for accomplishing the stated function are reduced to a minimum and do not involve the principle of refrigeration; to provide an apparatus for separating a plurality of gases from each other without resort to liquefaction; for extracting a plurality of gases from the ambient atmosphere and separating the gases so extracted from each other without recourse to the principle of refrigeration; and to provide an apparatus for accomplishing the foregoing enumerated functions which is portable in character and adapted for use in the field with the auxiliaries of machine propelled vehicles and vessels.

Other objects and many of the attendant advantages of this invention will be readily appreciated as the same becomes better understood by reference to the following description when considered in connection with the accompanying drawing wherein:

Fig. 1 is a diagrammatic representation of one embodiment which my invention may take; and, Fig. 2 shows the vapor pressure-temperature characteristic curves of certain gases which have been absorbed for illustrative purposes in charcoal in amounts below their respective saturation quantities, the pressure ordinate of the curves representing vapor pressures of the absorbed gases which will effect their removal from the charcoal.

Referring now to the drawing there is shown in Fig. 1 thereof a container 1 in which there is enclosed a suitable absorbent 2. This absorbent may be charcoal or any other convenient absorptive medium for absorbing the gas or gases whose presence it is desired to detect or which are to be extracted from the ambient atmosphere. A funnel shaped member 3 communicates with the container in the manner shown and serves as a port of ingress for the gas to be analyzed. For passing the gas into contact with the absorptive medium 2 there is provided a pump 4 of any suitable design which is driven by prime mover 5 and connected to the container 1 by a conduit 6, a valve 7 being positioned in the said conduit for controlling communication between the pump and container. Instead of using the conventional pump 4 and prime mover 5 shown, the conduit 6 may be connected directly to the intake manifold of an internal combustion engine to thus provide the necessary suction and insure the passage of the gas to be analyzed into intimate contact with the absorptive medium 2. When the desired quantities of the gas or gases not in excess of their respective saturation quantities have been absorbed by the medium 2, the valve 7 is closed.

For absorbing any gas or gases liberated from the absorptive medium 2 there is provided a second but movable absorptive medium 8. This latter medium is contained within a supply receptacle 9 and is supplied therefrom by means of the conduit 10 to a container 11 from which latter container it is discharged by means of a conduit 12 to any convenient point. The conduit 12 may be fabricated of glass or any other suitable insulating material. A valve 13 serves to replenish the fluid supply in the container 9 and a valve 14 provides a convenient means of interrupting the flow of the fluid medium when it is desired to render the apparatus inoperative. It is thus clear that there is a continuous flow of the fluid medium 8 from the container 9 through conduit 10 into the container 11 and from thence through the conduit 12 to a point of discharge when the apparatus is in operation. The continuous flow of this fluid medium insures the presentation of different portions thereof to different gases liberated from the absorptive medium 2 and thus makes possible the detection of any absorbed gases in the movable medium. The rate of flow of the movable medium is adjusted so that there will be at all times but a relatively small quantity of the medium within the container 11 to thereby insure a maximum concentration of any gas or gases absorbed in the medium. The medium 8 is chosen such that its electrical conductivity is changed by the absorption of any gas or gases therein whose presence it is desired to detect. Such a medium may be water, any aqueous solution or any other medium which has the previously stated characteristics.

For passing any gas or gases liberated from the absorptive medium 2 into contact and solution with the movable medium 8 there is provided a conduit 15 connected as shown, gas flow therethrough being insured and facilitated by a differential pressure established through the conduit 16 connecting the container 11 with the intake side of the pump 4. The conduit 12 is chosen of sufficient vertical length to permit slight changes in pressure in the container 11 without affecting the liquid flow in the conduit 12 to an appreciable extent. The valve 17 when open permits the flow of any liberated gas or gases through the conduit 15 and into solution with the fluid medium 8 within the container 11.

For removing the absorbed gas or gases from the medium 2 there is passed through this medium and conduit 15 by means of the differential pressure established as aforesaid a small current or stream of the gas to be analyzed, this gas being progressively heated by the resistance unit 18, the energization of which by the source of electromotive force 19 is controlled by the rheostat 20 and presented to different portions of the movable fluid medium 8 for absorption thereby. The absorption of the small stream of gas is thus without cumulative effect. If the constituent parts of this stream of gas that are capable of altering the electrical conductivity of the fluid medium 8 are present in considerable concentrations, it will be necessary to employ a source of gas other than the gas under analysis for removing any gas or gases absorbed in the medium 2 as will be pointed out more in detail hereinafter. As a source of electromotive force the storage battery commonly associated with an internal combustion engine may be employed. The passage of the gas through the medium 2 causes the progressive heating thereof with attendant removal therefrom of the absorbed gas or gases in the order of their respective temperatures at which the gas or gases developed sufficient vapor pressure to preclude their retention by the said absorptive medium. It is to be emphasized that only a small current or stream of the gas is drawn through the absorbent 2 to remove absorbed gases, the differential pressure being regulated and other component parts of the apparatus designed to the attainment of this end. Any alteration of the electrical conductivity of the movable medium 8 occasioned by this small stream of gas is inappreciable and of such a magnitude that it cannot be detected by the detecting means used herein and to be described hereinafter. This is important as will at once become apparent. If, for example, the gas to be analyzed contains only one gas whose presence is to be detected, this gas after absorption by the medium 2 within the container 1 will be removed therefrom at its critical temperature by the passage of the progressively heated, small current of gas through the absorptive medium and its presence detected thereafter. If now the progressively heated, small current of gas did not inappreciably alter the electrical conductivity of the movable medium 8, its electrical conductivity would be continuously altered to a detectible extent after the removal and detection of the single gas absorbed in the medium 2, with the result that the detecting means and the indicating means responsive thereto would show erroneously the presence of gases other than the single gas actually present. Instead of employing the gas to be analyzed for the removal of any gas or gases absorbed in the medium 2 there may be used a gas which is neither absorbed by the medium 2 nor is capable of altering the electrical conductivity of the movable medium 8 when passed into contact therewith. Gaseous fluids of the latter character will readily suggest themselves to those skilled in the art. In the event a gaseous fluid of this latter type is employed, it is evident that the quantity and rate of flow thereof into contact with the movable medium 8 need no longer be critical.

The movable absorptive medium 8, as previously pointed out, is chosen such that its electrical conductivity is altered by the absorption of any gas or gases therein whose presence it is desired to detect. Any appreciable change in its electrical conductivity occasioned by any gas absorption is detected by any suitable means, such as for example, any convenient amplifying unit 21 known to the prior art; it being understood, of course, that this unit includes all necessary sources of electromotive force for detecting any appreciable change in the electrical conductivity of the movable medium 8 as well as for effecting amplification. The input side of this amplifying unit is electrically connected to electrodes 22 and 23 positioned within the conduit 12 in such a manner as to be immersed in the fluid medium 8 wherein any absorbed gases are to be detected. Since the conduit 12 is of insulating material short circuiting of the electrodes by the conduit is effectively prevented. In the output circuit of the amplifying unit 21 there is shown a solenoid 24 for cooperating with and actuating a normally open and movable switch contact 25 to a closed position under predetermined conditions. It is obvious however that any suitable indicating means might be substituted for the solenoid 24 and the electrical system to be described hereinafter for advising the operator of any change in the electrical conductivity of the movable medium 8 attending any gas absorption therein in appreciable quantities. Such an indicating means in conjunction with a thermometer 26 for indicating the temperature of the liberated gas or gases and the gaseous fluid for effecting their liberation, would enable the detection of a gas or gases. This is possible since the thermometer 26 will record the temperature at which any absorbed gas or gases in the medium 2 develop sufficient vapor pressure to enable their removal from the medium; and the indicating means will advise the operator of the presence of any such absorbed gas in the movable medium 8. By referring to curves of the type depicted in Fig. 2 for various gases, the gas or gases absorbed by the movable medium 8 are quickly determined.

For automatically and selectively detecting the presence of a plurality of gases or one of a plurality of gases, there is provided an electrical system which is identified in general by the reference character 27. This system includes an indicating device 28, a source of electromotive force 29 and a plurality of resistances 30, 31, 32, 33 and 34, corresponding in number to the number of gases to be detected and arranged for parallel energization. The system is shown for illustrative purposes as arranged for the detection of five separate gases, it being evident however that it may be arranged for the detection of any desired number of gases.

Stationary contacts 30', 31', 32', 33', 34' within the interior of the thermometer 26 are arranged for cooperation and engagement with the expansible mercury column 35 and are connected respectively to the resistances 30, 31, 32, 33 and 34. The movable contact 25 of the system switch 36 is also connected to a stationary contact (not shown) within the mercury. The resistances 30, 31, 32, 33, 34 are conveniently chosen and shown as of equal value it being obvious to those skilled in the art, however, that this is not essential. The resistances may, for example, have different values it being apparent in either case that when they are progressively connected in parallel attending the rise of the mercury column 35 that their combined resistance will increasingly diminish, resulting in an increased flow of current to the indicating means 28 which may for example be an ammeter.

The electrical system has been designed for the detection of five separate gases which for illustrative purposes have been chosen as carbon dioxide, chlorine, phosgene, Lewisite and mustard gas. It is to be emphasized, however, that the system can be designed for the detection of any number of toxic and/or non-toxic gases. The vapor pressure-temperature characteristic curves for the chosen gases are shown in Fig. 2, these curves being those obtained when the gases are absorbed in charcoal. The characteristic curves for these gases when absorbed in any other suitable medium can, of course, be readily obtained. The curves 37, 38, 39, 40 and 41 shown in Fig. 2 are respectively for the gases, carbon dioxide, chlorine, phosgene, Lewisite and mustard gas. The contacts 30', 31', 32', 33', 34' within the thermometer 26 are positioned at points corresponding to different mercury levels, which levels in turn are determined by the respective temperatures at which the gases develop sufficient vapor pressure to preclude their retention by the absorptive medium 2 and which gases in the case here illustrated are carbon dioxide, chlorine, phosgene, Lewisite and mustard gas capable of being absorbed by a medium of charcoal. Thus, as the mercury 35 gradually rises due to the progressive heating of the gaseous fluid medium passed through the absorbent 2, increasing numbers of resistances are connected and prepared for parallel energization. The indicating means 28 is calibrated by marking on the face thereof the chemical symbols for carbon dioxide, chlorine, phosgene, Lewisite and mustard gas at points corresponding to the respective positions assumed by the pointer 42, when the resistance 30; resistances 30, 31; resistances 30, 31, 32; resistances 30, 31, 32, 33; and resistances 30, 31, 32, 33, 34 are connected in circuit.

The operation of the apparatus will now be described, it being assumed that the ambient atmosphere contains carbon dioxide, chlorine, phosgene, Lewisite, and mustard gas, the presence of which is unknown to the operator. Furthermore, for illustrative purposes it is assumed that the absorptive medium 2 is charcoal which will absorb and extract these gases from the ambient atmosphere and that the movable medium 8 is water.

In its initial position of adjustment the valves 7 and 17 are closed and the pump 4 is then set in operation by the prime mover 5. The valve 7 is now opened and the ambient atmosphere to be analyzed is passed through the absorptive medium 2 until the desired quantities of carbon dioxide, chlorine, phosgene, Lewisite and mustard gas not in excess of their respective saturation quantities have been absorbed thereby, the atmosphere for this purpose and by way of example being passed through the absorptive medium 2 for five minutes. These gases are absorbed by the medium 2 at ambient, atmospheric temperature and pressure; and after the desired quantities have been absorbed the valve 7 is closed and the valve 17 opened. The opening of the valve 17 immediately causes the passage of a small current of the atmosphere through the absorptive medium 2 and conduit 15 into contact with the movable medium 8 within the container 11 due to the differential pressure established by the conduit 16 connected to the intake side of the pump 4. The temperature of the atmosphere or gaseous fluid passing through the conduit 15 is recorded by the thermometer 26, a portion of which projects into the conduit 15. The rheostat 20 is now adjusted so that the current of air passing through the absorptive medium 2 will be heated to a temperature of 110° C. This temperature, as will become evident from an inspection of the curves in Fig. 2, is sufficient to cause the removal of any absorbed carbon dioxide from the charcoal 2 but is insufficient to effect the removal of any of the remaining absorbed gases. The mercury 35 in the thermometer 26 will now rise so as to engage the stationary contact 30' and the carbon dioxide liberated from the absorptive medium 2 will pass into solution with the movable medium 8 where it is ionized with consequent alteration in the electrical conductivity of the medium. This change in the electrical conductivity of the medium 8 is detected by the amplifying unit 21 resulting in energization of the solenoid 24 and closure of the normally open movable contact 25. The electrical system 27 with the single resistance 30 in circuit is now energized and the pointer 42 of the indicating means 28 takes a position which advises the operator that carbon dioxide is present in the ambient atmosphere. The rheostat 20 is now readjusted to cause a heating of the atmosphere to a temperature of 120° C. at which temperature the chlorine absorbed by the medium 2 is liberated. The mercury 35 within the thermometer 26 rises to a point where it engages in addition to the contact 30' the contact 31'; and the chlorine liberated by passage of the heated gaseous fluid through the medium 2 passes into solution with the movable medium 8 where its electrical conductivity is altered. The change in electrical conductivity again causes energization of the solenoid 24 of the amplifying unit 21 which in turn causes the movable contact 25 of the system switch 36 to move to a closed position. Since now the electrical system 27 is energized through the parallel connected resistances 30 and 31 there will be an increased current flow in the system and the pointer 42 of the ammeter 28 will take a position to indicate the presence of chlorine to the operator of the apparatus. For removing the phosgene absorbed by the charcoal 2 the rheostat is adjusted such that the resistance unit 18 will heat the atmosphere to a temperature of 130° C. The fluid medium at this temperature removes the phosgene from the charcoal 2 but will not remove the absorbed Lewisite and mustard gases. The mercury in the thermometer 26 now rises to a level where the resistances 30, 31 and 32 are connected in parallel preparatory to their energization. After the passage of the liberated phosgene into solution with the movable medium 8 the solenoid 24 of the amplifying unit 21 is energized to close the normally open movable contact 25 of switch 36 in a manner previously described. The current flow in the electrical system 27 will now be increased because of the parallel connection of the resistances 30, 31 and 32 and the pointer 42 of the ammeter 28 will indicate the presence of phosgene. For the removal of the Lewisite and mustard gases absorbed in the medium 2 the gaseous fluid is heated successively to temperatures of 140° C., and 150° C., the Lewisite and mustard gases so liberated being detected and indicated in a manner similar to that described in connection with the previously liberated gases by the progressive rise of the mercury to include the resistance 33 and 34 in circuit.

In view of the foregoing, it is evident that the apparatus of my invention can be made highly specific, as well as extremely sensitive; and in view of the fact that the apparatus may utilize the intake manifold of an internal combustion engine for a pump and the accompanying storage battery for heating the small quantities of the ambient atmosphere necessary to effect the removal of any absorbed gases in the medium 2, the apparatus will add but little weight to any vehicle or vessel on which it may be necessary to use the same.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. In an apparatus for detecting the presence of one or more toxic gases in the ambient atmosphere, in combination, a conduit supply means for introducing said atmosphere into the apparatus under ambient conditions of temperature and pressure, a first closed absorbing vessel connected to said conduit supply means, said first vessel being arranged to contact a gas with an absorbent therein, heating means associated with said first vessel, a second closed absorbing vessel arranged to contact a gas with a liquid absorbent therein, a conduit connecting said first and second vessel, said conduit being joined to said second vessel at a lower portion thereof, temperature indicating means associated with said conduit means to indicate the temperature of material passing therethrough, draining means connected to said second vessel and arranged to drain a portion of liquid absorbent therefrom while maintaining a body of said liquid therein, and indicating means associated with said liquid draining means for indicating relative conductivity of the liquid drained therethrough.

2. In an apparatus for detecting the presence of one or more toxic gases in the ambient atmosphere, in combination, a conduit supply means for introducing said atmosphere into the apparatus under ambient conditions of temperature and pressure, a first closed absorbing vessel connected to said conduit supply means, said first vessel being arranged to contact a gas with an absorbent therein, heating means associated with said first vessel, a second closed absorbing vessel arranged to contact a gas with a liquid absorbent therein, a conduit connecting said first vessel to a lower portion of said second vessel, temperature indicating means associated with said conduit means to indicate the temperature of material passing therethrough, draining means connected to said second vessel for draining liquid absorbent therefrom, liquid absorbent supply means connected to said second vessel, and indicating means associated with said draining means for indicating relative conductivity of material passing therethrough.

3. In an apparatus for detecting the presence of one or more toxic gases in the ambient atmosphere, in combination, a conduit supply means or introducing said atmosphere into the apparatus under ambient conditions of temperature and pressure, a first closed absorbing vessel connected to said conduit supply means, said first vessel being arranged to contact a gas with an absorbent therein, heating means associated with said first vessel, a second closed absorbing vessel arranged to contact a gas with a liquid absorbent therein, a conduit connecting said first vessel to a lower portion of said second vessel, temperature indicating means associated with said conduit means to indicate the temperature of material passing therethrough, draining means connected to said second vessel for draining liquid absorbent therefrom, liquid absorbent supply means connected to said second vessel, exhaust pump means connected to an upper portion of said second vessel, and indicating means associated with said draining means for indicating relative conductivity of material passing therethrough.

4. In an apparatus for detecting the presence of one or more toxic gases in the ambient atmosphere, in combination, a conduit supply means for introducing said atmosphere into the apparatus under ambient conditions of temperature and pressure, a first closed absorbing vessel connected to said conduit supply means, said first vessel being arranged to contact a gas with an absorbent therein, heating means associated with said first vessel, a second closed absorbing vessel arranged to contact a gas with a liquid absorbent therein, a conduit connecting said first vessel to a lower portion of said second vessel, draining means connected to said second vessel and arranged to drain a portion of liquid absorbent therefrom while maintaining a body of said liquid therein, temperature indicating means associated with said conduit means to indicate the temperature of material passing therethrough, relative conductivity indicating means associated with said liquid draining means for indicating relative conductivity of the liquid drained therethrough, and means associated with both said indicating means arranged to render said temperature indicating means inoperative upon a decrease of conductivity below a minimum value of the liquid drained through said liquid draining means as indicated by said relative conductivity indicating means.

5. In an apparatus for detecting the presence of one or more toxic gases in the ambient atmosphere, in combination, a conduit supply means for introducing said atmosphere into the apparatus under ambient conditions of temperature and pressure, a first closed absorbing vessel having an inlet and an outlet portion connected at its inlet portion to said conduit supply means, said first vessel being arranged to contact a gas with an absorbent therein, heating means associated with said first vessel, a second closed absorbing vessel arranged to contact a gas with a liquid absorbent therein, a first conduit connecting said first vessel at its outlet portion to a lower portion of said second vessel, a valve in said first conduit, an exhaust pump, a second conduit connecting said pump to the outlet portion of said first vessel, a valve in said second conduit, a third conduit connecting said pump to an upper portion of said second vessel, draining means for liquid absorbent connected to said second vessel, liquid absorbent supply means connected to said second vessel, temperature indicating means associated with said first conduit to indicate the temperature of material passing therethrough, and indicating means associated with said draining means for indicating relative conductivity of material passing therethrough.

OLIVER T. FRANCIS.